United States Patent [19]

Weber

[11] Patent Number: 5,034,870
[45] Date of Patent: Jul. 23, 1991

[54] ADJUSTMENT DEVICE FOR AIMING DEVICES

[75] Inventor: Walter K. Weber, Grand Rapids, Mich.

[73] Assignee: KB Lighting Inc., Kentwood, Mich.

[21] Appl. No.: 478,263

[22] Filed: Feb. 9, 1990

[51] Int. Cl.⁵ .............................................. F21M 3/20
[52] U.S. Cl. ...................................... 362/428; 362/66; 74/416; 74/606 R
[58] Field of Search .................... 362/66, 69, 70, 287, 362/289, 421, 422, 424, 427, 428; 74/416, 606 R, 424.8 R, 89.15, 424.6

[56] References Cited

U.S. PATENT DOCUMENTS

| | | | |
|---|---|---|---|
| 2,868,030 | 1/1959 | Forwald | 74/424.8 R |
| 4,703,399 | 10/1987 | Van Duyn et al. | 362/66 |
| 4,707,770 | 11/1987 | Van Duyn | 362/66 |
| 4,731,707 | 3/1988 | McMahan et al. | 362/66 |
| 4,742,435 | 5/1988 | Van Duyn et al. | 362/66 |
| 4,809,139 | 2/1989 | Ryder et al. | 362/66 |
| 4,843,523 | 6/1989 | Nakamura | 362/69 |
| 4,893,219 | 1/1990 | Lisak | 362/66 |
| 4,930,367 | 6/1990 | Nagasawa | 74/416 |
| 4,939,945 | 7/1990 | Ryder et al. | 362/66 |

Primary Examiner—Ira S. Lazarus
Assistant Examiner—Richard R. Cole
Attorney, Agent, or Firm—Michael J. Striker

[57] ABSTRACT

An adjustment device for positioning an aiming device on a support comprises a body, a clamping element provided on the body for clamping the body in a guide of a support for an aiming device, a connecting element extending through the body and connectable with its one end to an aiming device, and an element for displacing the connecting element relative to the body in a longitudinal direction so as to adjust the position of the aiming device relative to the support.

12 Claims, 3 Drawing Sheets

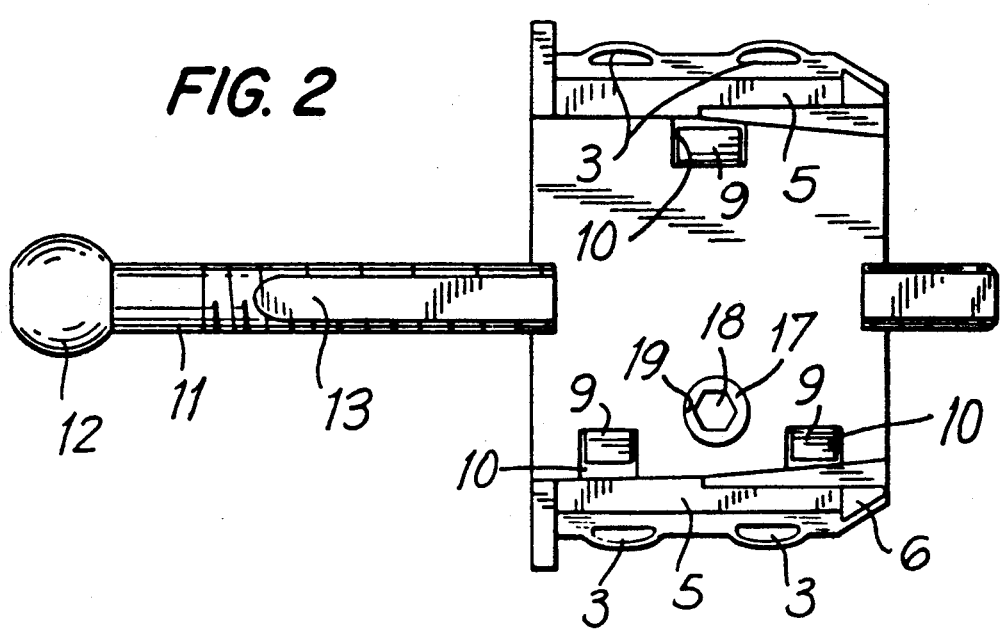
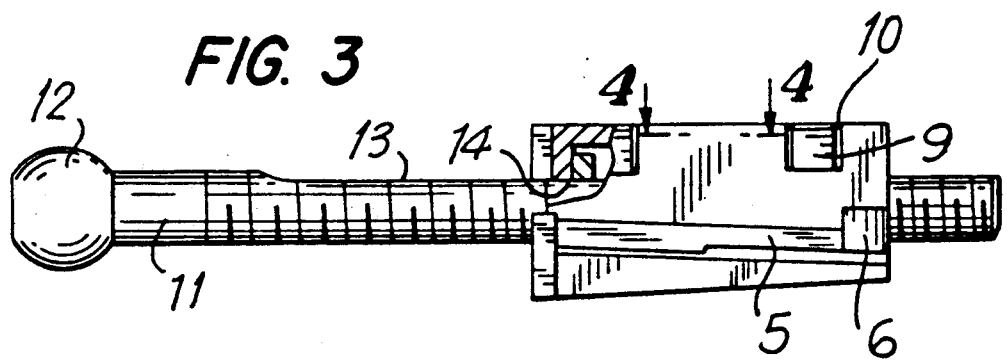
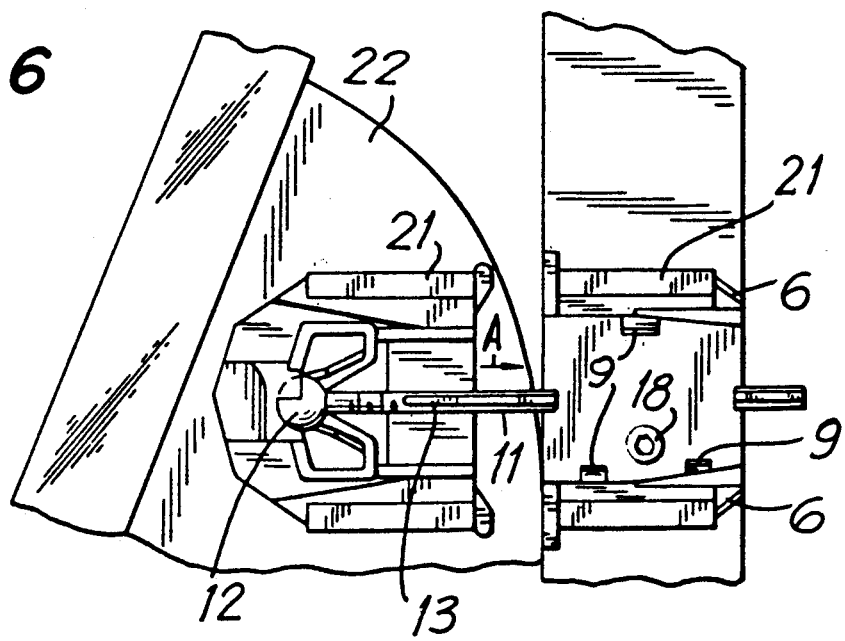

ADJUSTMENT DEVICE FOR AIMING DEVICES

BACKGROUND OF THE INVENTION

The present invention relates to an adjustment device for an aiming device, for example a headlamp on a support of an automobile.

A headlamp of an automobile must be connected to a support in an adjustable manner, so that the headlamp can be adjusted relative to the support at a desired angle. An adjustment insert has been proposed in U.S. patent application Ser. No. 407,920. The adjustment insert is attachable to the headlamp and holds a turnable connecting element whose opposite end is connected to a support. It has been found that it is desirable to adjust the connection of the opposite end of the turnable connecting element with the support, to provide an easy and desired position of the headlamp.

SUMMARY OF THE INVENTION

Accordingly, it is an object of the present invention to provide an adjustment device for an aiming device, for example a headlamp, which permits adjustment of the turnable connecting element relative to the support of the aiming device.

In keeping with these objects and with others which will become apparent hereinafter, one feature of the present invention resides, briefly stated, in an adjustment device which has a body, clamping means provided on the body for clamping the body in a guide of a support, a turnable connecting element extending through and movable relative to the body, and means for displacing the turnable connecting element relative to the body by a predetermined path and accessible from outside of the body.

When the adjustment device is designed in accordance with the present invention, the turnable connecting element can be displaced in the body when the body is clamped in the support, and therefore the distance between the aiming device, for example a headlamp and the support can be adjusted in a desired manner. The adjustment is easily performed from outside of the body by a user in a simple and convenient manner.

The connecting element can be formed as a threaded element which is non-rotatably and longitudinally displaceably arranged in said body, and the adjusting means can include a toothed wheel accessible from outside of the body and turnable by a user and engageable with the toothed element so as to displace the latter in response to turning of the toothed wheel.

The threaded member can have a flattening at its one longitudinal side, and the body can have a non-circular opening with a cross-section corresponding to a cross-section of the threaded element in the region of the flattening, so that during displacement of the threaded element it cannot rotate.

The toothed wheel can have at least one shaft portion extending at least one of its axial sides and accessible from outside of the body, and the shaft can have an end provided with an engaging hole to be engaged by a tool so as to turn the shaft and thereby to turn the toothed wheel.

Means for attaching two parts of the body to one another can include a plurality of projections provided on one of the body parts and having each an end and an engaging formation at the end, and a plurality of holes provided in the other of the body parts so that the projections can extend through the hole and the engaging formation can engage with the other body part so as to attach the body parts to one another.

The clamping means can include at least two flexible ears each provided on a respective edge of the body and compressible during insertion of the body in the guide of the support to apply a side pressure.

The flexible ears can be provided on the lower body part. The clamping means can also include four such flexible ears arranged so that two of the flexible ears are arranged on each edge of the body.

Means for limiting an insertion of the body in the guide of the support can be provided. The limiting means can include at least one end tab provided on the rear end of the body. They can also include two such end tabs provided at the rear end of the body and arranged at opposite sides to the longitudinal axis.

The clamping means can further include two projections located at both sides of the longitudinal axis and extending substantially in the direction of the longitudinal axis, and the projections can have a front end provided with an engaging formation engageable behind the guide of the support. The projections can be arranged on the upper body part.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a plan view of the inventive adjustment device;

FIG. 3 is a side view of the inventive adjustment device;

FIG. 6 is a view showing an assembly of a headlamp and a support with the inventive adjustment device.

DESCRIPTION OF A PREFERRED EMBODIMENT

Figure 1:
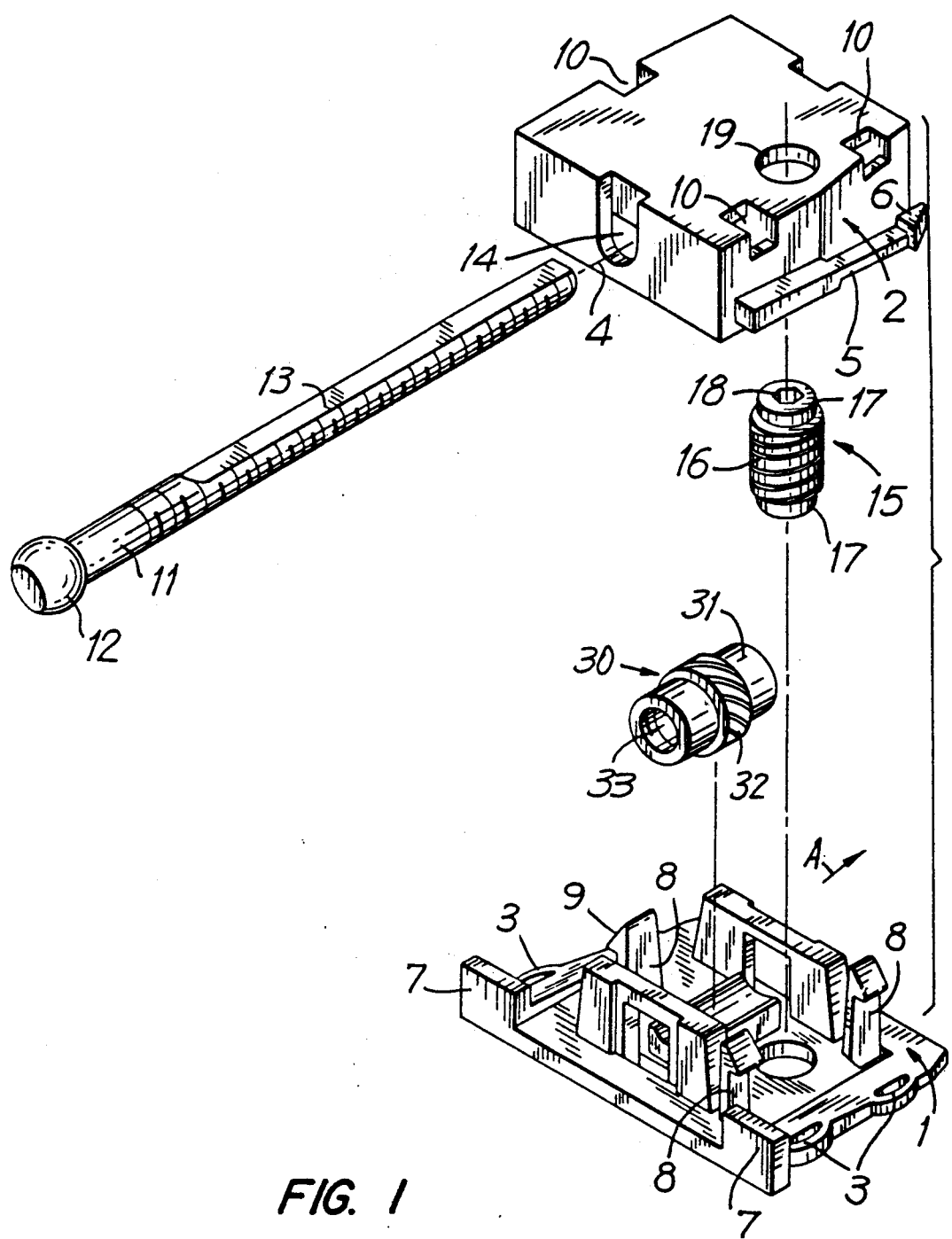
FIG. 1 is an exploded view of an adjustment device in accordance with the present invention.
Figure 4:
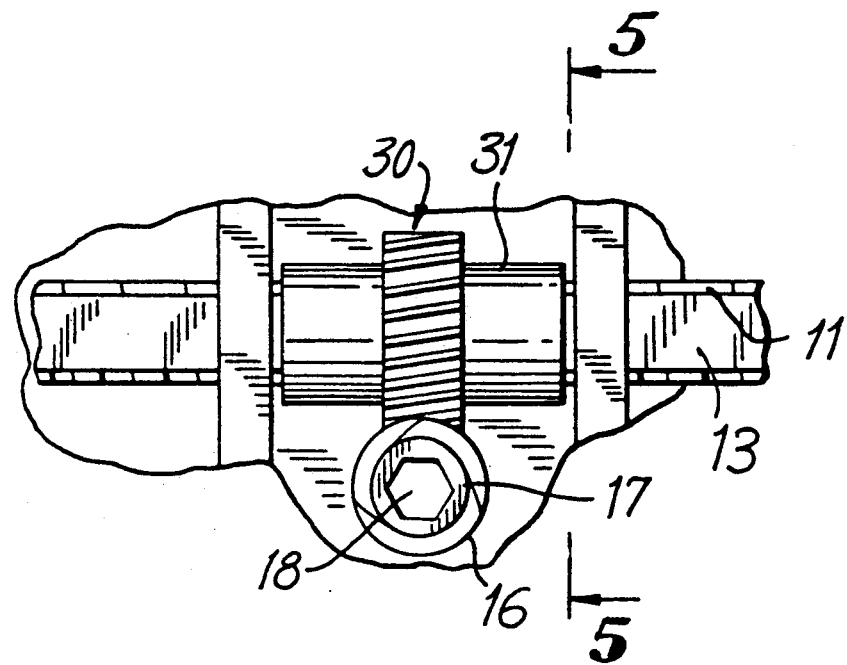
FIG. 4 is a plan view of the inventive adjustment device with a removed upper part of the body.
Figure 5:
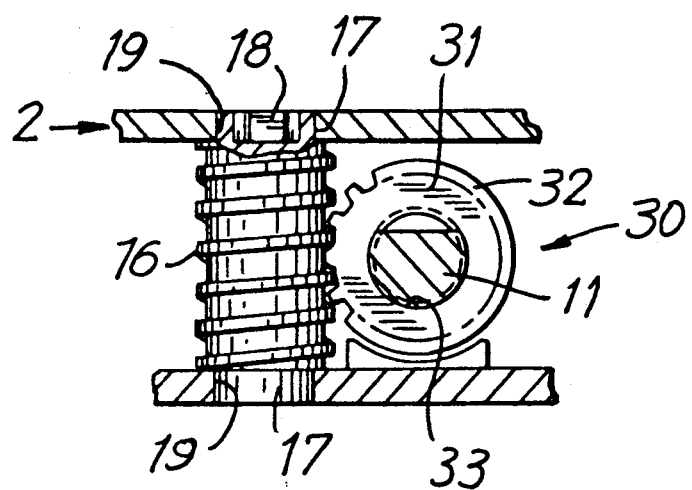
FIG. 5 is a side view of the adjustment device with a removed wall.

An adjustment device in accordance with the present invention has a body which includes a lower body part 1 and an upper body part 2. The body is provided with clamping means for clamping the body in a guide of a support for an aiming device, for example a headlamp. The clamping means include four flexible ears 3. The ears 3 are arranged so that each pair of the ears are provided on an edge of the lower body part 1 at one side of its longitudinal axis. When the body is inserted into a guide of the support by sliding in direction of the arrow A, the flexible ears 3 are compressed and apply a side pressure to the walls of the guides. The clamping means further include two projections 5 located at opposite sides of the longitudinal axis 4 and extending substantially in the longitudinal axis. Each projection 5 is provided at its front end with engaging formation 6 arranged to engage behind the front end of the guide of the support. The projections 5 are provided on the upper body part 2.

Means are further provided for limiting the insertion of the body into the guide of the aiming device. The limiting means includes two end tabs 7 located at the rear end of the lower body part 1 at the opposite side of the longitudinal axis 4. The end tabs 7 extend laterally outwardly beyond the flexible ears 3. They limit the insertion of the adjustment insert into the guide of the support from the rear side.

Means are further provided for attaching the lower body part with the upper body part. The attaching means includes three upright projections 8 provided on the lower body part 1 and ending in engaging formations 9. The upper body part 2 in turn is provided with three openings 10 formed in the region of its upper longitudinal edges. Two of such openings 10 are located at one side of the longitudinal axis while the third opening 10 is located at the opposite side of the longitudinal axis. When the upper body part 2 is pressed downwardly onto the lower body part 1, the engaging formations 9 of the projections 8 of the lower body part 2 engage behind the upper edges of the lateral walls in the region of the openings 10 of the upper body part, so that the body parts 1 and 2 become connected with one another.

The adjustment device further has a connecting element which is formed as a screw 11. The screw has a head 12 which is preferably spherical and a shaft 13. The shaft 13 is threaded and has a flattening on its upper side. The connecting element 11 extends through a longitudinal opening 14 provided in the upper body part 2. The longitudinal opening is substantially semi-circular, or more particularly has a cross-section corresponding to the cross-section of the threaded shaft 13 of the connecting element 11. An adjusting element 15 is provided for displacing the connecting element 11 in the longitudinal direction. The adjusting element 15 includes a toothed wheel 16 and two shaft portions 17 extending in two opposite axial directions. Each shaft portion 17 is provided with an engaging hole for example a hexagonal hole 18. In the assembled condition of the adjustment device, the toothed wheel 16 engages with the toothed shank 13, while the shaft portions 17 extend through upper and lower walls of the upper body part 2 so that their tapered ends are lodged in tapered openings 19 of these walls, and one engaging hole 18 is accessible from above.

In operating condition, the adjusting device in accordance with the present invention is inserted into a guide 19 of a support 20 for a headlight by pushing the body part in an assembled condition in direction of the arrow a. The flexible ears 3 are compressed and apply a lateral pressure, the engaging formations 6 engage forwardly beyond the front end of the guide, the end tabs 7 abut against the rear end of the guide, so that the insert is reliably fixed in place. The spherical head 12 of the turnable connecting element 11 is inserted in an adjusting insert formed for example as disclosed in the U.S. patent application Ser. No. 407,920. This insert is inserted in a guide 21 of a headlamp 22. For adjusting the headlamp, a tool, for example with an engaging projection such as a hexagonal projection is inserted in the hole 18 of the shaft 17 of the adjusting member 15 and turned in respective direction. As a result, the toothed wheel 16 displaces the connecting member longitudinally. Since the upper flattening of the connecting member coincides with the upper flattening of the opening 14 in the upper body part 2, a turning of the connecting element 11 is reliably prevented and it moves only in the longitudinal direction. As a result, the position of the headlamp 22 is adjusted.

It will be understood that each of the elements described above, or two or more together, may also find a useful application in other types of constructions differing from the types described above.

While the invention has been illustrated and described as embodied in an adjustment device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An adjustment device for positioning an aiming device on a support, comprising a body; clamping means provided on said body for clamping said body in a guide of a support for an aiming device; a connecting element extending through said body and connectable with its one end to an aiming device; and means for displacing said connecting element relative to said body in a longitudinal direction so as to adjust the position of the aiming device relative to the support, said body having a longitudinal axis and two edges located at both sides of said longitudinal axis, said clamping means including at least two flexible ears each provided on a respective one of said edges and compressible during insertion of said body in the guide of the support to apply a side pressure.

2. An adjustment device as defined in claim 1, wherein said connecting element is formed as a threaded element which is non-rotatably and longitudinally displaceably arranged in said body, said adjusting means including a toothed wheel accessible from outside of the body and turnable by a user and engageable with said threaded element so as to displace the latter in response to turning of the toothed wheel.

3. An adjustment device as defined in claim 2, wherein said threaded member has a flattening at its one longitudinal side, said body having a non-circular opening with a cross-section corresponding to a cross-section of said threaded element in the region of said flattening, so that during displacement of said threaded element it cannot be rotated.

4. An adjustment device as defined in claim 3, wherein said toothed wheel has at least one shaft portion extending at at least one of its axial sides and accessible from outside of said body, said shaft having an end provided with an engaging hole to be engaged by a tool so as to turn said shaft and thereby to turn said toothed wheel.

5. An adjustment device as defined in claim 1, wherein said body has a lower body part and an upper body part; and further comprising means for attaching said two parts to one another, said attaching means including a plurality of projections provided on one of said body parts and having each an end and an engaging formation at said end, and a plurality of holes provided in the other of said body parts so that said projections can extend through said hole and said engaging formation can engage with said other body part so as to attach the body parts to one another.

6. An adjustment device as defined in claim 1, wherein said body has a lower body part and an upper body part, said flexible ears being provided on said lower body part.

7. An adjustment device as defined in claim 1, wherein said clamping means include four such flexible ears arranged so that two of said flexible ears are arranged on each of said edges of said body.

8. An adjustment device as defined in claim 1; and further comprising means for limiting an insertion of said body in the guide of the support.

9. An adjustment device as defined in claim 8, wherein said body has a longitudinal axis, and a front end and a rear end spaced from one another in direction of said longitudinal axis, said limiting means including at least one end tab provided on said rear end of said body.

10. An adjustment device as defined in claim 9, wherein said limiting means includes two such end tabs provided at the rear end of said body and arranged at opposite sides to said longitudinal axis.

11. An adjustment device as defined in claim 1, wherein said clamping means further includes two projections located at both sides of said longitudinal axis and extending substantially in the direction of said longitudinal axis, said projections having a front end provided with an engaging formation engageable behind the guide of the support.

12. An adjustment device as defined in claim 11, wherein said body has an upper body part and a lower body part, said projections being arranged on said upper body part.

* * * * *